March 22, 1927.
T. E. DAUGHERTY
1,621,925
THEFT PREVENTING DEVICE
Filed Sept. 27, 1921   3 Sheets-Sheet 1
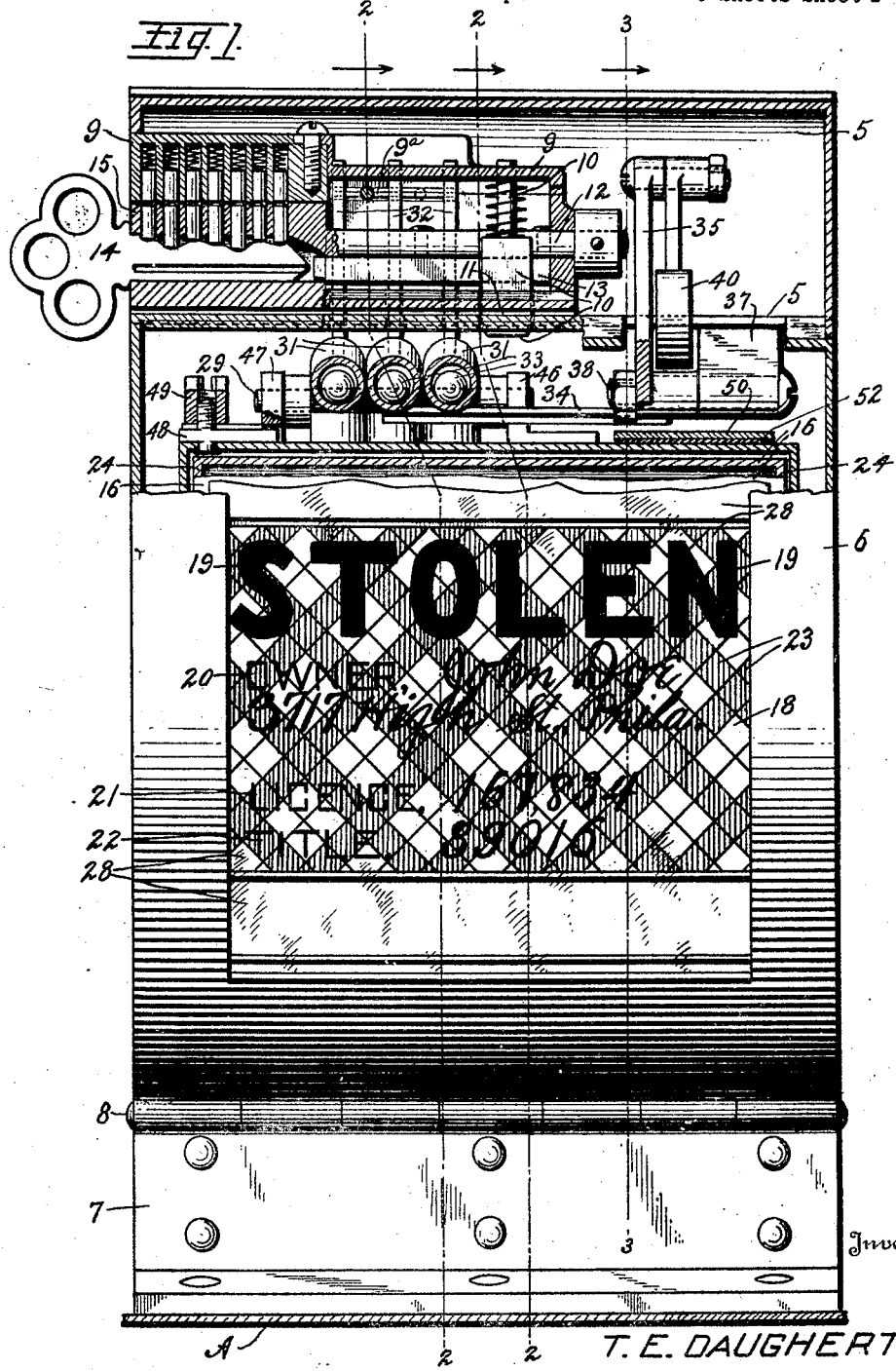
Inventor,
T. E. DAUGHERTY.
By Sterling P. Buck, Attorney March 22, 1927.
T. E. DAUGHERTY
1,621,925
THEFT PREVENTING DEVICE
Filed Sept. 27, 1921    3 Sheets-Sheet 2
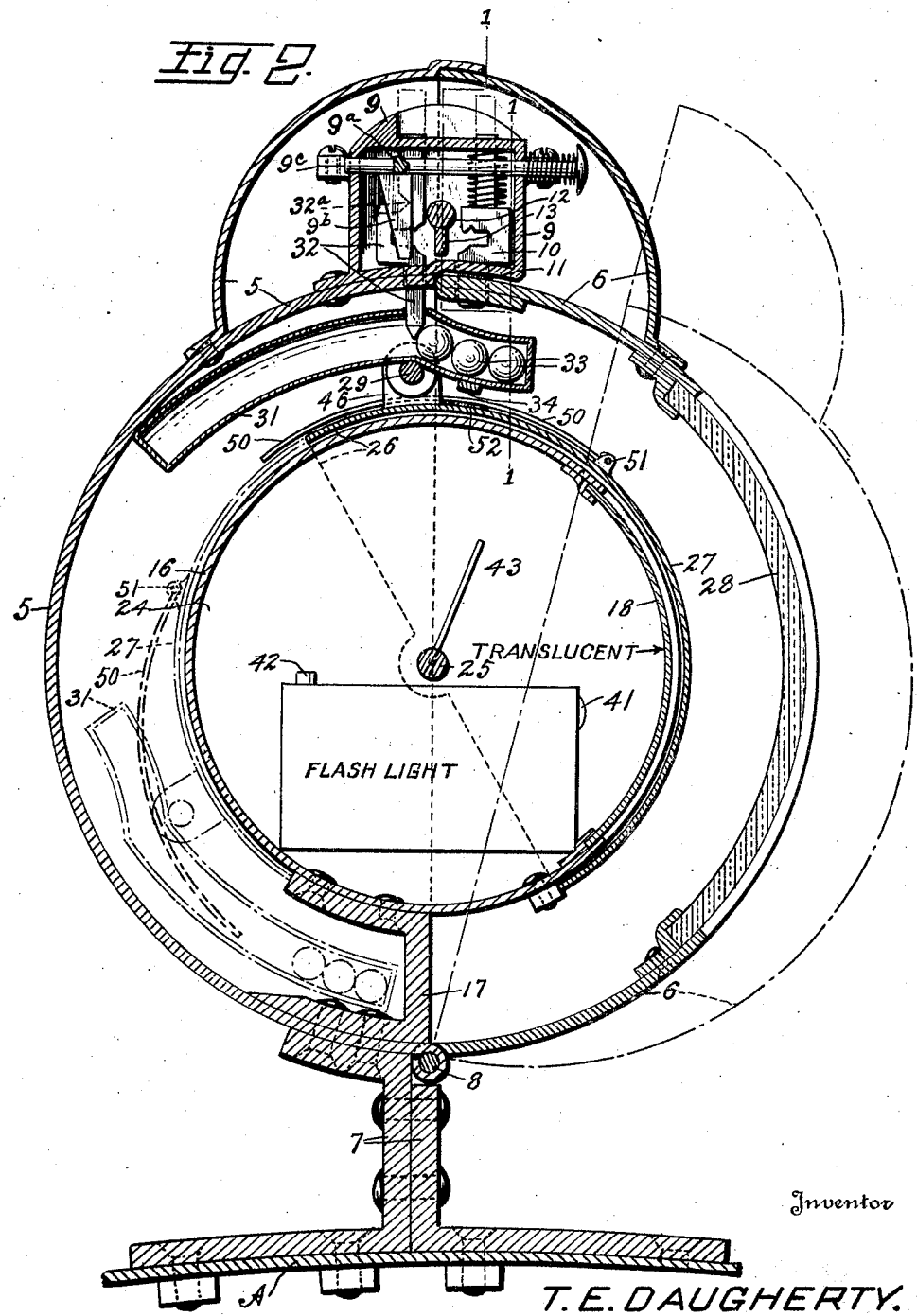
Inventor
T. E. DAUGHERTY.
By Sterling P Buck, Attorney.

March 22, 1927.
T. E. DAUGHERTY
THEFT PREVENTING DEVICE
Filed Sept. 27, 1921    3 Sheets-Sheet 3
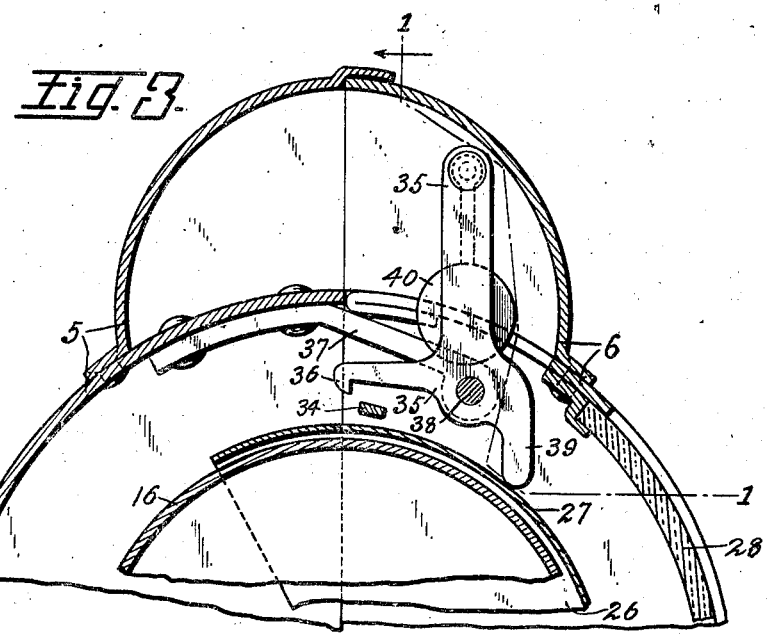
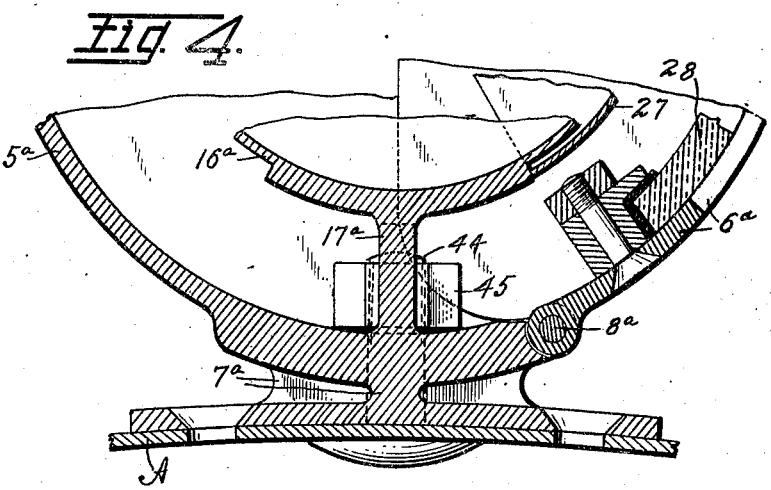
Inventor,
T. E. DAUGHERTY.
By Sterling P. Buck,
Attorney Patented Mar. 22, 1927.

1,621,925

UNITED STATES PATENT OFFICE.

THOMAS E. DAUGHERTY, OF BALTIMORE, MARYLAND.

THEFT-PREVENTING DEVICE.

Application filed September 27, 1921. Serial No. 503,579.

This invention relates to theft exposing and preventing devices, and more specifically to a theft-exposing signal, for attachment to an automobile or other vehicle, for exposing (and thereby preventing) theft of the vehicle, and for identifying the rightful owner, possessor or user of the automobile or other vehicle. The term "vehicle", as used herein, is to be construed to include automobiles and all other road-vehicles.

One object of this invention is to provide a device of this character that is applicable to every kind of road-vehicle and operates under all conditions to which such vehicles are subject, in traveling.

A further object is to provide a device of this character that is attachable to the external parts of a vehicle, in public view, so that any tampering therewith will attract public and official attention, thus raising the question of rightful use of the vehicle; also, attachable to any convenient prominent part of the vehicle, such as the hood, cowl, a mud-guard or fender, so the owner can most conveniently and easily set the device for operation, without having to stoop or assume any other inconvenient or uncomfortable attitude in thus setting it.

A further object of the invention is to provide a device of this character that depends only upon the irregular (or faster and slower) traveling movements of the vehicle to cause the signal to operate, when it has been set, and which can be locked, against such operation, by the rightful owner.

A further object is to provide means to automatically illuminate the theft-exposing sign when the device operates to expose the sign to public view, and to fully protect both the sign and illuminating means against being tampered with.

A further object is to provide a device of this character in which the means for securing it to the vehicle is fully protected against disconnection by an unauthorized person.

Other objects and advantages will be pointed out or implied in the following details of description. in connection with the accompanying drawings in which:

Fig. 1 is a view partly in front elevation and partly in vertical section, the section being taken substantially along the lines 1—1—1 of Fig. 2, and 1—1 of Fig. 3.

Fig. 2 is a vertical sectional view, the sections being taken at right angles to those in Fig. 1, along the lines 2—2, 2—2 of Fig. 1, or approximately along these lines.

Fig. 3 is a sectional view of the top part of the device, the section being taken substantially along the line 3—3 of Fig. 1.

Fig. 4 is a vertical sectional view of a somewhat modified form of the invention.

Referring to these drawings in detail, in which similar reference characters correspond to similar parts throughout the several views, and in which the device is shown applied to a part of a fender or mud-guard A, as one mode of applying the device; the invention consists in the construction, arrangement, application and relation of parts which will now be fully described as follows:

An outer casing is formed of two relatively movable or hinged sections 5 and 6, the former being rigidly secured to a base or pedestal which is secured to the fender or mud-guard A or any appropriate part of an automobile or other vehicle by bolts or other appropriate means. The front section 6 is hinged at 8 to the section 5, and is swingable on this hinge to open and close the outer casing. This casing may comprise two compartments, in the upper one of which I may secure a lock 9 of any appropriate kind. In the form of the invention as here illustrated, the lock 9 includes a bolt 10 which extends through apertures in the interlapped upper edges of the casing-sections 5 and 6, as shown at 11. The lock may also include a cylinder-extension 12 provided with a wing 13 by means of which the bolt 10 can be withdrawn from the part 11 when the key 14 (Fig. 1) is turned counter-clockwise. The mechanism unlocked by inserting the key is of previously known construction, being of the character shown in Patent No. 416,181, dated Dec. 3, 1889; but the mechanism unlocked by the turning of the key and by the consequent turning of the tumbler or barrel or cylinder 15 and its extension 12, is of novel construction, as will presently appear.

Within the outer casing 5—6, an inner casing or sign-support 16 is secured by any appropriate means, for instance, by a supporting element 17. A translucent plate or card 18 has or may have any appropriate words, signs or symbols printed or otherwise affixed thereto for indicating a theft as indicated at 19, and for indicating ownership, license and title, as indicated at 20, 21 and 22 respectively. The card 19 is preferably provided with a distinctive front-surface-design, as for instance, crossed red stripes, as indicated, or any appropriate design that is not easily repaired when an erasure has been made thereon; such distinctive surface-design being indicated at 23.

In the present illustration of the invention, the member 16 is in the form of a hollow cylinder having closed ends, the closing walls 24 of which are centrally apertured to form bearings for an axle or shaft 25 whose ends project out through the walls 24 and are fixed to the semi-circular end plates 26 of a shield or cover 27 that normally hides the card or plate 18 from view, this cover only being seen through a transparent member 28 of the outer casing-section 6, that is, through a window in the front part of the outer casing. A shaft or axle 29 is journalled in suitable bearings 30 on the shield 27, and a tube or tubes 31 are secured to this axle and thereby secured to the shield 27, being movable therewith and relative thereto for a purpose which will now be explained as follows:

When the automobile or other vehicle, to which this device is attached, is under control or in charge of the rightful person it is desired to secure the shield 27 against movement from its normal or shielding position; but when the owner or rightful user of the machine or vehicle leaves it he sets it for operation by releasing it from the securing means, so that the irregular traveling movement of the vehicle will cause the shield to swing rearward to the broken line position, thus uncovering or revealing or displaying the card or sign 18 for indicating that the vehicle is stolen or not in possession of the rightful person; for such rightful person is presumed to have the key 14, and it is presumed that he would have locked the shield 27 had he returned to the vehicle and started it. For locking the member 27, a bolt 32 is provided and extends into the apertured upper side of one of the tubes 31. There may be one of the bolts 32 for each one of the tubes 31, as shown in Fig. 1, and these bolts serve the dual purpose of locking the shield 27 and preventing dislodgement of a ball, balls or rollers 33 from their normal position. Broadly considered, the balls 33 are movable weights that are shifted, by movement of the vehicle, from their normal position in the front end of the tubes 31, when the bolts 32 are withdrawn. The withdrawal of the bolts is accomplished by the same means as the withdrawal of the bolt 10, viz. the cylinder extension 12—13; but the unlocking movement of these elements 12—13 is clockwise for the bolts 32. A spring-pressed detent or dog 9ª engages alternately with notches 32ª in the bolts 32, and an arm 9ᵇ of the dog 9ª is pressed by the wing 13 for actuating the dog. The lock-housing may be divided at 9ᶜ, and the separable parts thereof may be united by screws or other appropriate means, thus providing for placing the bolts and dog in the lock-casing.

The balls or weights 33 overbalance the rear ends of the tubes 31, thus holding the tubes in the normal position shown in full lines in Figs. 1 and 2, and this front end portion of the tubes is forwardly inclined, so that the balls remain in this normal position even when the bolts 32 are withdrawn from the paths of the balls and from the tube-engaging position, except when the vehicle is traveling; and then if the bolts 35 are withdrawn, the irregular traveling movement, especially a forwardly accelerated movement, will cause the rearmost balls to roll rearward and add their weight to the rear end of the tubes, overbalancing the front ends of the tubes, thus more nearly leveling the latter so that the remaining balls now roll rearward, overbalancing the shield 27 and causing it to swing rearward to the broken line position and uncover or expose the theft indicating sign on the plate 27.

To prevent the shield from moving rearward when the bolts are withdrawn while the vehicle is standing on an up-grade or down-grade surface, I provide the controlling mechanism illustrated in Figs. 1 and 3, in which a bar 34 is secured to the tubes 33 and provides shoulders engageable by an oscillatory detent 35 including a hook 36 and being pivoted on an arm 37 which extends forward from the casing-section 5 to which it is secured. The pivot 38 may be a screw or an integral element of the arm 37, as preferred. Any appropriate means may be employed to limit the swing of the member 35, for instance, a stop-arm 39 which abuts against the shield 27.

A pendulum 40 is pivoted or otherwise suspended from the top part of the member 35 and serves several purposes as follows:

When the vehicle is fronting up-hill, the pendulum hangs rearward of the position shown, and its weight exerts a downward pull on the rear part of the member 35, causing its hook to engage with the bar 34, so that even if the balls should roll rearward, the shield is detained by the hook 36 so long as the vehicle is not traveling. Moreover, the added weight of the pendulum and rear part of the member 35 prevents the tubes 31 from tilting, so that the balls can not roll rearward; the inclination of the surface on which the rearmost ball rests being greater than the inclination of any hill that can be climbed by an automobile; but when the automobile or vehicle starts to travel while the bolts 32 are withdrawn and the hook 36 is engaged with the bar 34, the balls will then roll rearward, tilting the tube 31 on their pivots or axle 29, and the pendulum will begin to swing, its forward movement exerting a pull on the member 35 that will disengage the hook 36 from the bar 34 and permit the shield to move rearward under the influence of the balls or weights in the rear ends of the tubes. It is obvious that if the front and rear parts of the device were reversed on the vehicle, the shield-controlling mechanism would operate, as above described, when the vehicle was facing downhill.

For the purpose of illuminating the sign 27, I may secure an electric bulb in the outer casing or inner casing in any appropriate way, and electrically connect the same with any convenient source within or without the device, also provide a switch or circuit closer of any appropriate kind and provide any appropriate means for automatically closing the switch when the sign is displayed or uncovered: For a simple example, I may provide an ordinary "flash light" including an electric bulb 41 and a switch or circuit closer 42, and on the shaft 25 I may provide an arm 43 that swings rearward and presses the circuit closer 42 when the shield moves rearward and carries the shaft 25 therewith.

It is not intended to limit this invention to the details of construction and arrangement shown and described, but changes may be made within the scope of the inventive ideas as implied and claimed. For instance, I may, instead of securing numerous parts together with rivets (as shown in Figs. 1, 2 and 3), form the members 5, 7, 16 and 17 integrally as indicated at $5^a$, $7^a$, $16^a$ and $17^a$, Fig. 4; and I may hinge the member $6^a$ laterally of the vertical center, as seen at $8^a$. I may also provide a central bolt-hole, and pass a bolt 44 therethrough and through the fender A, or mud-guard, and this bolt may be held against rotation in any appropriate way so that it cannot be removed except by removing its nut 45. The casing must be unlocked in order that access may be had to the nut; so the only way an unauthorized person (having no key for the lock) can remove the device from the fender, is by tearing the fender, and this disfiguration of the fender is clear evidence of unauthorized use.

The use and operation of the device are as follows:

When the rightful user of the vehicle leaves it, he inserts the key 14 into the lock, turns it clockwise, and removes it, thus leaving the bolts 32 retracted so that the tubes 31, balls 33 and shield 27 are free to move. A mere vibration of the vehicle will not move these parts, so they are not affected by the running of the motor or by children playing in the vehicle; but a forward motion of varying speed will cause the rearward movement of the shield in the manner previously explained. If an officer demands that the license, title or other evidence of ownership be shown, the owner or rightful user turns the key 14 for unlocking the outer casing, as previously explained, and then, by hand moves the shield so as to display such evidence on the sign 18. Of course, the bolts 32 must be retracted before the shield can be moved by hand. It can then also be returned by hand, and the balls 33 can be replaced in the normal position by any appropriate means. One way of replacing them is to remove the shaft 29 from its bearings 46 and 47, then tilting the tubes 31 until the balls return by gravity to the front ends of the tubes, then replacing the shaft 29 in the bearings. The bearing 47 may be removable or it may be longitudinally slidable by its slotted engagement with a guide 48, so the shaft 29 and tubes 31 are easily removable. A nut 49 may secure the bearing in normal position. The foregoing is only one of various ways the balls or weights may be returned to normal. After the user unlocks or sets the device for operation, he must again lock it before he starts the automobile or other vehicle.

If a vehicle be equipped with a device of this character and is suspected of bearing fictitious markers or license numbers, the rightful user can quickly prove proper marking by displaying the proper number or identification in the casing. The distinctive paper or plate bearing the identifications is not only a protection against changing the identifications thereon, but is preferably of an individual design owned or controlled by the inventor of this device, or his assigns, so it can not be bought in open market, and is not easily duplicated by a printer.

If a vandal should detach or attempt to detach the device from the vehicle, the very holes through which it was anchored, or the distorted appearance of the device and its anchorage would be "ear marks" or obvious indications of theft or attempted theft.

This device does not become a nuisance by falsely indicating a theft or unauthorized use, because it does not operate while parked, but only when it is traveling while its operating mechanism is unlocked.

This device not only avoids theft, but also "joy riding" or other unauthorized use by chauffeurs, garagemen and others.

An audible signal or sounding device may be provided for notifying the user of the vehicle in case he starts to travel in the vehicle without first locking the sign-hiding shield, also for attracting public and official attention to a vehicle in possession of unauthorized persons. One form of audible signal is here shown and includes a plate or other member 50, of sonorous material which, may be hinged to the shield 27 at 51, and a pad 52 of felt or other appropriate material may be provided for the member 50 to normally rest upon. However, when the shield 27 is in the broken line position, the sound-plate 50 swings as a pendulum, when the vehicle is traveling, and strikes the inner and outer casings, thereby resounding so as to attract attention.

What I claim as my invention is:

1. A signalling device which includes a casing attachable to a road-vehicle; a sign in the casing; means manually settable to hide the sign and being mounted for shifting in consequence of traveling movements of the road-vehicle, for displaying the sign; and means including a lock to combine with the casing, for securing the said manually settable means against being operated by said traveling movements or by any person without unlocking said lock.

2. A signalling device which includes a casing attachable to a road-vehicle; a signal in the casing and including a signal-controlling element which is shiftable to and from a signalling and a non-signalling position and mounted for standing in the non-signalling position when the road-vehicle is traveling, but constructed for operation by traveling movements for shifting to the signalling position; detaining means to secure the said signal-controlling element against being shifted by such traveling movements; the casing being provided with means to prevent and permit access to and manipulation of the signal-controlling element; and means to unlock the locking means and actuate said detaining means.

3. A signalling device which includes a casing attachable to a road-vehicle, said casing including a closure section movable for opening and closing the casing; a lock for said closure section; a sign-element and a sign-hiding element relatively shiftable for hiding and displaying the sign-element, the shiftable one of these said elements, being within said casing and being manually settable when the casing is unlocked, but being inaccessible for manipulation when the casing is locked; detaining means to hold the manually settable element in the sign-hiding position when the road-vehicle is not traveling, but being shiftable from such sign-hiding position by traveling-movements of the road-vehicle; a lock operable to secure the said shiftable element against actuation by said traveling movements; and manually operable means to unlock the last said lock.

4. The structure defined by claim 2; and electric lighting means including a circuit closer in said casing and controllable by said signal-controlling element, the lighting means being located for illuminating the signal.

5. The structure defined by claim 2, said detaining means including a detent operable to engage with an element on said signal; and means operable by motion of the road-vehicle, for releasing said element from said detent.

6. The structure defined by claim 2, said detaining means including a detent operable to engage with an element of said signal; means operable by motion of the road-vehicle, for releasing said element from said detent, the last said means including a pendulum mounted to accumulate force and exert said force on said detent.

7. The structure defined by claim 2, said detaining means including a detent operable to engage with an element of said signal; means operable by the road-vehicle, for releasing said element from said detent, the last said means including a pendulum mounted to exert its force on said detent, the latter being pivotally mounted and having an upward extension, said pendulum being mounted on said upward extension.

8. The structure defined by claim 2; and an audible signal in said casing and operable by the means that displays the signal.

9. The structure defined by claim 2; and an audible signal in said casing and protected thereby, said audible signal being operable by a motion of the road-vehicle when it is traveling while the sign is exposed to view; means being provided to prevent operation of the audible signal when the sign is not exposed to view.

10. In a signal for road vehicles: the combination of a casing provided with means for attaching it to a road-vehicle, said casing including a window; a sign which is normally hidden within the casing and constitutes an evidence of unauthorized use when it is visible through said window; and normally locked means to control the hiding of said sign, said normally locked means being provided with means to hold it in its normal position when unlocked while the vehicle is at rest, and this normally locked means also being shiftable by a traveling movement of the road-vehicle and thereby effective for rendering said sign visible through said window.

In testimony whereof, I affix my signature.

THOMAS E. DAUGHERTY.